United States Patent
Kataoka et al.

(10) Patent No.: US 12,013,009 B2
(45) Date of Patent: Jun. 18, 2024

(54) DAMPER APPARATUS

(71) Applicant: AISIN CORPORATION, Kariya (JP)

(72) Inventors: Naoya Kataoka, Kariya (JP); Isao Okubo, Kariya (JP); Shinpei Tokumori, Kariya (JP)

(73) Assignee: AISIN CORPORATION, Aichi (JP)

( * ) Notice: Subject to any disclaimer, the term of this patent is extended or adjusted under 35 U.S.C. 154(b) by 578 days.

(21) Appl. No.: 17/206,587

(22) Filed: Mar. 19, 2021

(65) Prior Publication Data

US 2021/0396296 A1 Dec. 23, 2021

(30) Foreign Application Priority Data

Jun. 19, 2020 (JP) ................................. 2020-106384

(51) Int. Cl.
*F16F 15/123* (2006.01)
*F16F 15/129* (2006.01)

(52) U.S. Cl.
CPC .... *F16F 15/12366* (2013.01); *F16F 15/1238* (2013.01); *F16F 15/129* (2013.01); *F16F 15/12326* (2013.01); *F16F 2222/04* (2013.01); *F16F 2228/001* (2013.01); *F16F 2230/02* (2013.01); *F16F 2230/36* (2013.01)

(58) Field of Classification Search
CPC ............. F16F 15/12366; F16F 15/1238; F16F 15/129; F16F 15/12326; F16F 2222/04; F16F 2228/001; F16F 2230/02; F16F 2230/36
USPC ........................................ 464/68.92; 192/205
See application file for complete search history.

(56) References Cited

U.S. PATENT DOCUMENTS

| | | | | |
|---|---|---|---|---|
| 4,171,627 A | * | 10/1979 | Fukuda | ..................... F16D 3/66 |
| 7,077,752 B2 | * | 7/2006 | Rohs | ................. F16F 15/13476 |
| 8,021,234 B2 | * | 9/2011 | Oono | ................. F16F 15/12326 |
| | | | | 464/68.92 |
| 11,378,133 B2 | * | 7/2022 | Aikawa | ................. F16F 15/123 |

(Continued)

FOREIGN PATENT DOCUMENTS

| | | |
|---|---|---|
| JP | 2017172692 A | 9/2017 |
| JP | 2018031454 A | 3/2018 |
| JP | 2019211082 A | 12/2019 |

OTHER PUBLICATIONS

Varsity Tutors, Hotmath, Tangent Line, retrieved from the internet Dec. 20, 2023 at <https:///www.varsitytutors.com>. (Year: 2007).*

*Primary Examiner* — Greg Binda
(74) *Attorney, Agent, or Firm* — BUCHANAN INGERSOLL & ROONEY PC (57) ABSTRACT

A damper apparatus includes a first rotating body, a second rotating body, and an elastic mechanism unit including an elastic body and paired seat members. The seat member includes a first surface portion coming into contact with one of the first rotating body and the second rotating body and a second surface portion coming into contact with another of the first rotating body and the second rotating body, a first angle θ1 formed by a first tangent line at a first point of contact, the first tangent line including a first vector and a second vector, and the first vector is 11.5°≤θ1≤22.0°, and a second angle θ2 formed by a second tangent line at a second point of contact, the second tangent line including a third vector and a fourth vector, and the third vector is 11.5°≤θ2≤22.0°.

3 Claims, 10 Drawing Sheets

(56) References Cited

U.S. PATENT DOCUMENTS

2017/0276211 A1 9/2017 Osumi et al.
2019/0128368 A1 5/2019 Senoue et al.

* cited by examiner

DAMPER APPARATUS

CROSS REFERENCE TO RELATED APPLICATIONS

This application is based on and claims priority under 35 U.S.C. § 119 to Japanese Patent Application No. 2020-106384, filed on Jun. 19, 2020, the entire content of which is incorporated herein by reference.

TECHNICAL FIELD

The technology disclosed in this application relates to a damper apparatus.

BACKGROUND DISCUSSION

In vehicles or the like, a damper apparatus is provided between a drive source such as an engine and a transmission on a torque transmission path to absorb vibration of torque transmitted from the drive source toward the transmission, and the damper apparatus is incorporated in, for example, a clutch device.

As a general configuration of the damper apparatus, for example, JP 2019-211082 A and JP 2018-31454 A disclose a technology in which a coil spring whose both ends are supported by paired seat members is interposed between a disc plate as an input member and a hub as an output member, the disc plate and the hub being capable of rotating relative to each other, and the elastic deformation of the coil spring is used to absorb and damp vibration in a torsional direction due to torque fluctuations.

In the damper apparatus as disclosed in JP 2019-211082 A and JP 2018-31454 A, when both the disc plate and the hub rotate at high speed and rotate relative to each other, centrifugal force acts on the seat member that supports the coil spring from both ends. There has been a problem that, due to the action of this centrifugal force, the seat member slides on the disc plate and/or the hub, so that hysteresis torque is generated and the damping characteristics of the damper apparatus itself are degraded. This problem becomes noticeable near the boundary between the relative rotation of the disc plate and the hub on a positive torque side and the relative rotation of the disc plate and the hub on a negative torque side (that is, near a twist angle of relative rotation of 0°).

A need thus exists for a damper apparatus which is not susceptible to the drawback mentioned above.

SUMMARY

A damper apparatus according to an aspect includes a first rotating body that rotates around a rotation axis, a second rotating body that rotates relative to the first rotating body around the rotation axis, and an elastic mechanism unit that includes an elastic body and paired seat members that support both ends of the elastic body, and that elastically connects the first rotating body and the second rotating body in a rotational direction. Each of the paired seat member includes, on a radially outer end surface, a first surface portion that comes into contact with one of the first rotating body and the second rotating body and a second surface portion that comes into contact with another of the first rotating body and the second rotating body when a twist angle related to the relative rotation of the first rotating body and the second rotating body is 0°. When the twist angle is 0°, a first angle θ1 that is formed by a first tangent line at a first point of contact where one of the first rotating body and the second rotating body comes into contact with the first surface portion, the first tangent line including a first vector in the rotational direction and a second vector in a direction orthogonal to the rotational direction, and the first vector is $11.5°≤θ1≤22.0°$. When the twist angle is 0°, a second angle θ2 that is formed by a second tangent line at a second point of contact where the another of the first rotating body and the second rotating body comes into contact with the second surface portion, the second tangent line including a third vector in the rotational direction and a fourth vector in a direction orthogonal to the rotational direction, and the third vector is $11.5°≤θ2≤22.0°$.

A damper apparatus according to another aspect includes a first rotating body that rotates around a rotation axis, a second rotating body that rotates relative to the first rotating body around the rotation axis, and an elastic mechanism unit that includes an elastic body and paired seat members that support both ends of the elastic body, and that elastically connects the first rotating body and the second rotating body in a rotational direction. Each of the paired seat members includes, on a radially outer end surface, a first surface portion that comes into contact with one of the first rotating body and the second rotating body and a second surface portion that comes into contact with another of the first rotating body and the second rotating body when a twist angle related to the relative rotation of the first rotating body and the second rotating body is 0°. When the twist angle is 0°, a first angle θ1 is formed by a first tangent line at a first point of contact where one of the first rotating body and the second rotating body comes into contact with the first surface portion, and the first vector, the first tangent line extending in a direction including a first vector in the rotational direction and a second vector in a direction orthogonal to the rotational direction. When the twist angle is 0° and centrifugal force F is generated in the direction orthogonal to the rotational direction, a relationship between frictional force $μ1Fcosθ1$ acting in a direction opposite to a direction in which the first tangent line extends and first component force $Fsinθ1$ of the centrifugal force F acting in the direction in which the first tangent line extends satisfies $-0.1F ≤ μ1Fcosθ1 - Fsinθ1 ≤ 0.1F$, where $μ1$ indicates a first coefficient of friction at the first point of contact. When the twist angle is 0°, a second angle θ2 is formed by a second tangent line at a second point of contact where the another of the first rotating body and the second rotating body comes into contact with the second surface portion, and the third vector, the second tangent line extending in a direction including a third vector in the rotational direction and a fourth vector in a direction orthogonal to the rotational direction. When the twist angle is 0° and the centrifugal force F is generated in the direction orthogonal to the rotational direction, a relationship between frictional force $μ2Fcosθ2$ acting in a direction opposite to a direction in which the second tangent line extends and second component force $Fsinθ2$ of the centrifugal force F acting in the direction in which the second tangent line extends satisfies $-0.1F ≤ μ2Fcosθ2 - Fsinθ2 ≤ 0.1F$, where $μ2$ indicates a second coefficient of friction at the second point of contact.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, various embodiments of the present disclosure will be described with reference to the accompanying drawings. The same reference numerals are given to the common constituent requirements in the drawings. It should also be noted that the components represented in one drawing may be omitted in another drawing for convenience of description. Furthermore, it should be noted that the attached drawings are not always drawn to the correct scale.

1. Configuration of Damper Apparatus

Figure 1:
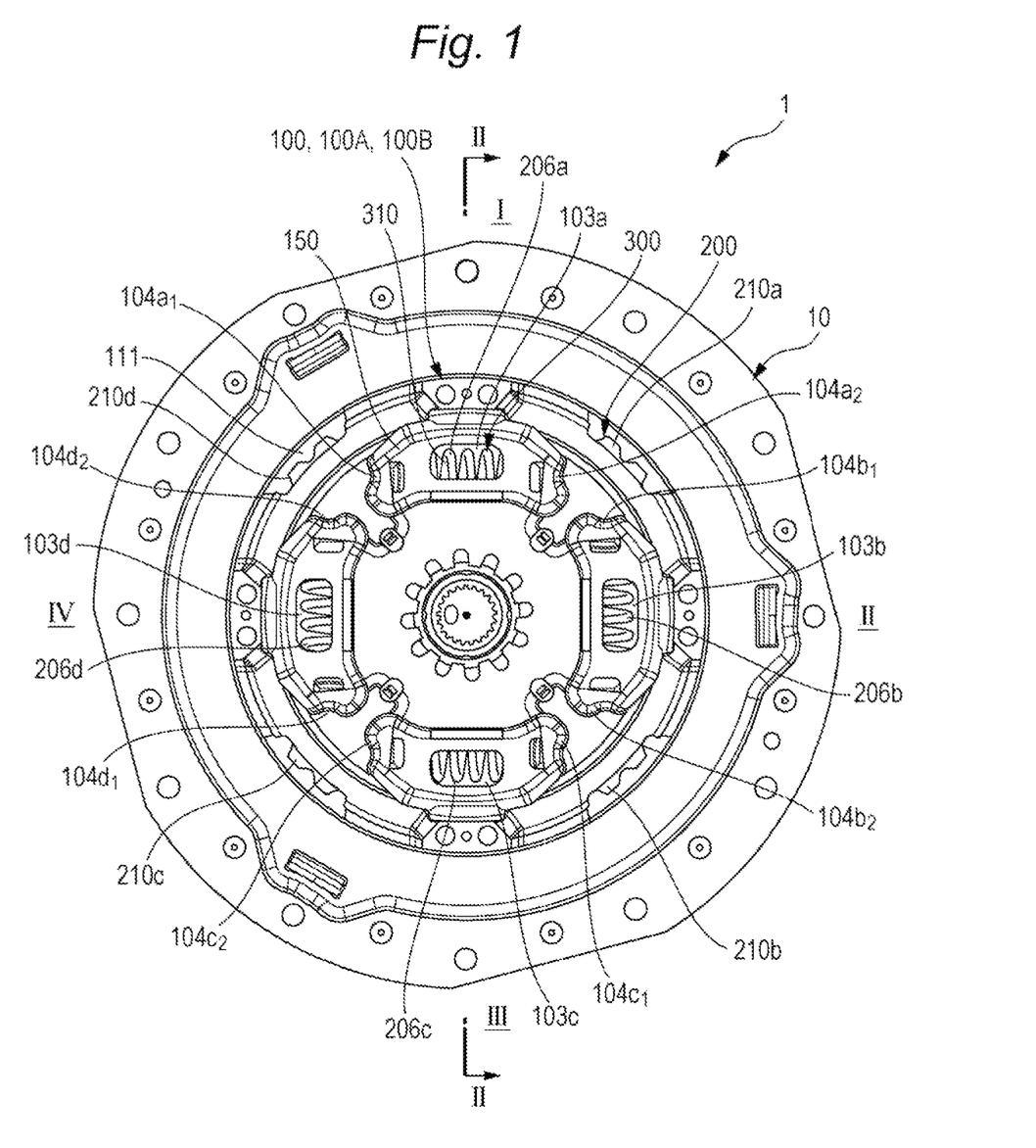
FIG. 1 is a schematic top view schematically illustrating a configuration of a damper apparatus according to a first embodiment.
Figure 2:
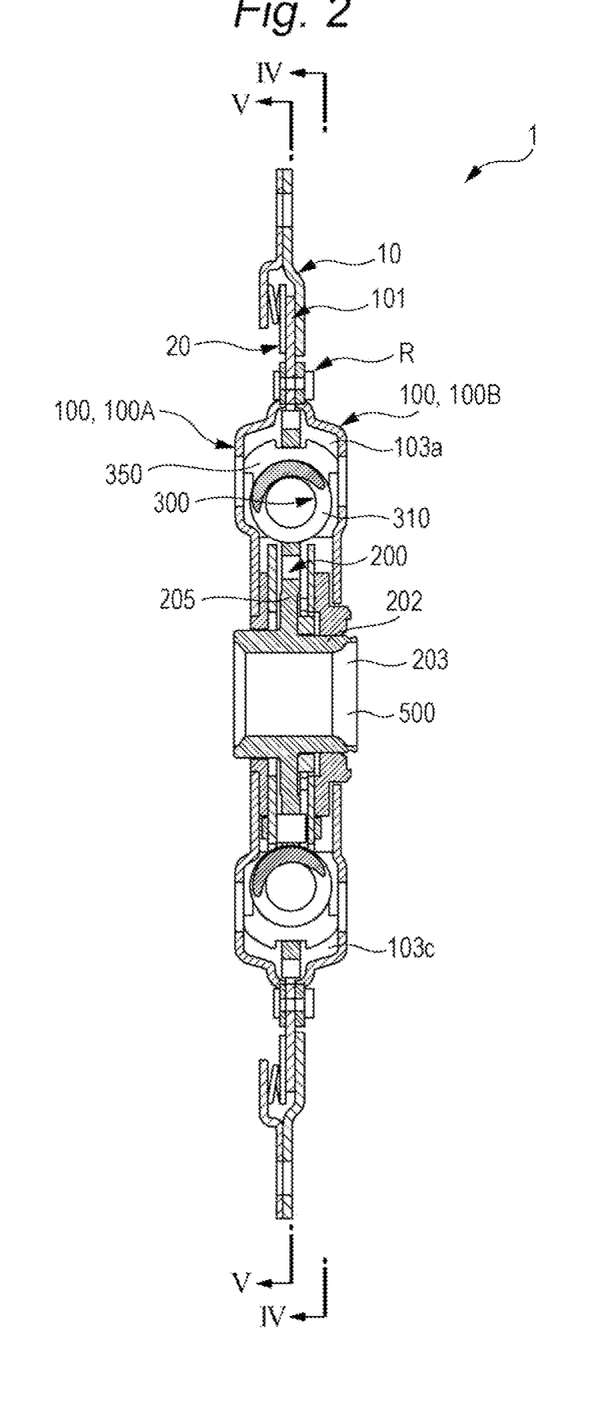
FIG. 2 is a schematic cross-sectional view schematically illustrating the configuration of the damper apparatus illustrated in FIG. 1 as viewed from a line II-II.
Figure 3:
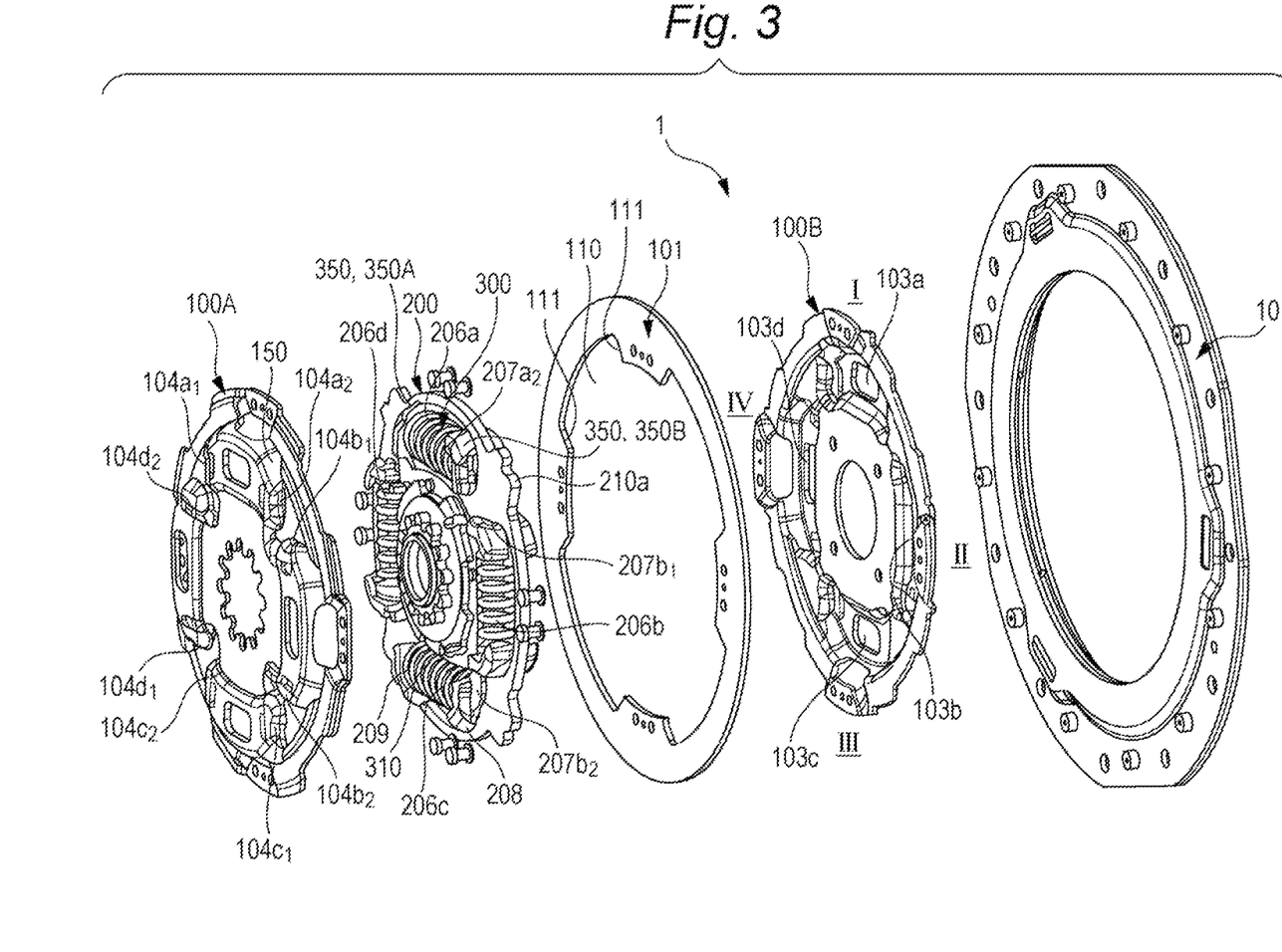
FIG. 3 is a schematic perspective view illustrating the configuration of the damper apparatus according to the first embodiment in an exploded manner into each component.
Figure 4:
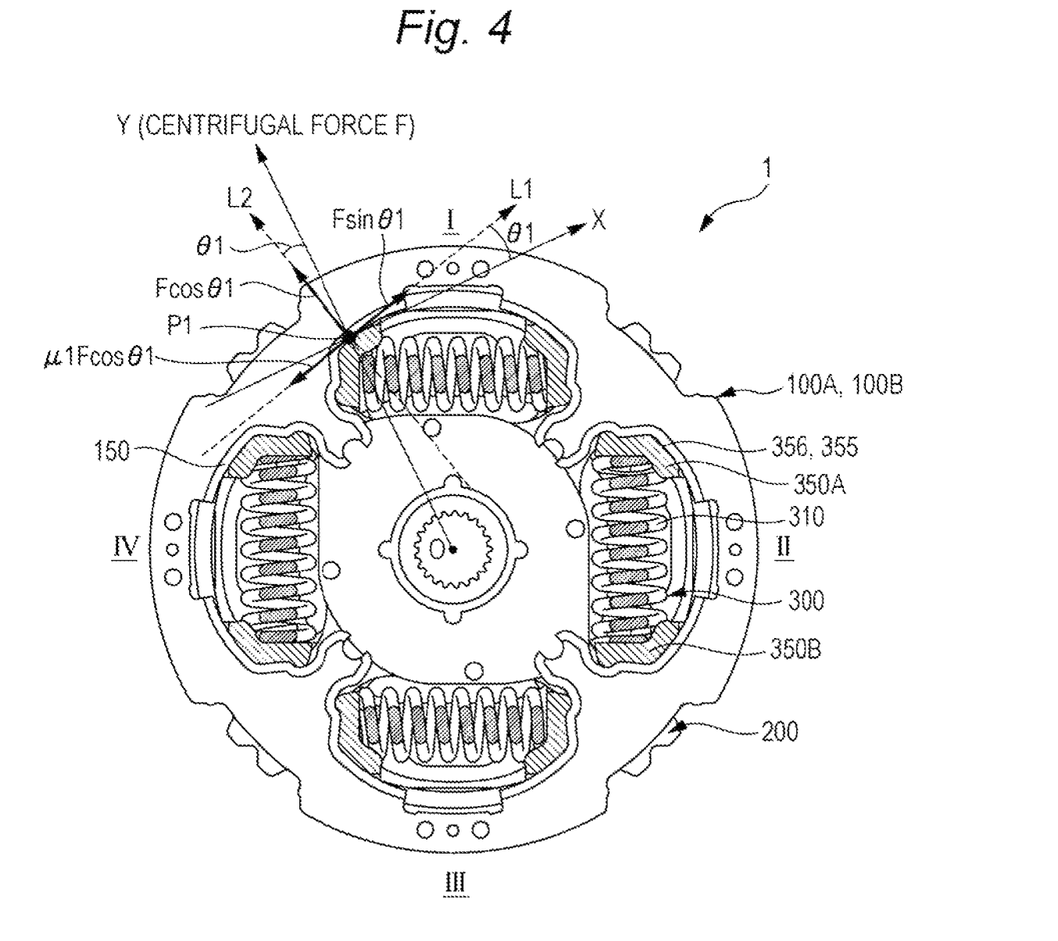
FIG. 4 is a schematic top view illustrating a contact relationship between a first rotating body and a seat member with respect to the configuration of the damper apparatus illustrated in FIG. 1.
Figure 5:
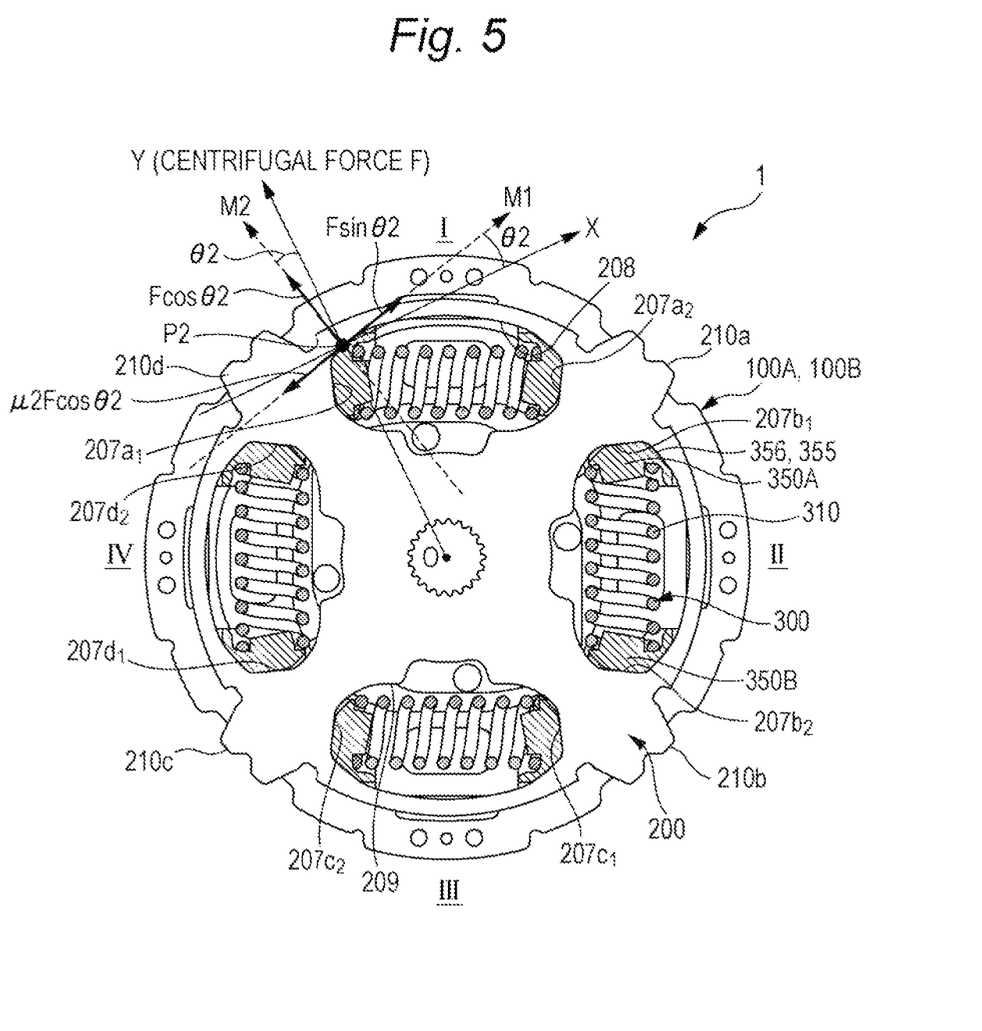
FIG. 5 is a schematic top view illustrating a contact relationship between a second rotating body and the seat member with respect to the configuration of the damper apparatus illustrated in FIG. 1.
Figure 6:
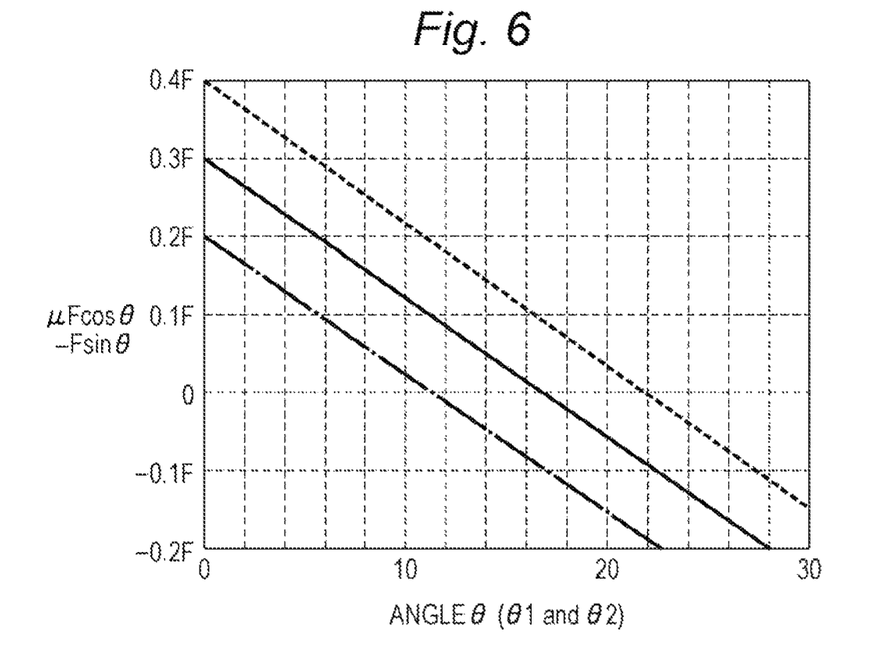
FIG. 6 is a graph illustrating a relationship between an angle θ(81 and 82) at a point of contact between the first rotating body and the seat member or a point of contact between the second rotating body and the seat member, and a value (μF cos θ−F sin θ) obtained by subtracting component force F sin θ of centrifugal force F acting on the point of contact from friction μF cos θ acting on the point of contact, where the centrifugal force acting on the point of contact is denoted by F.
Figure 7:
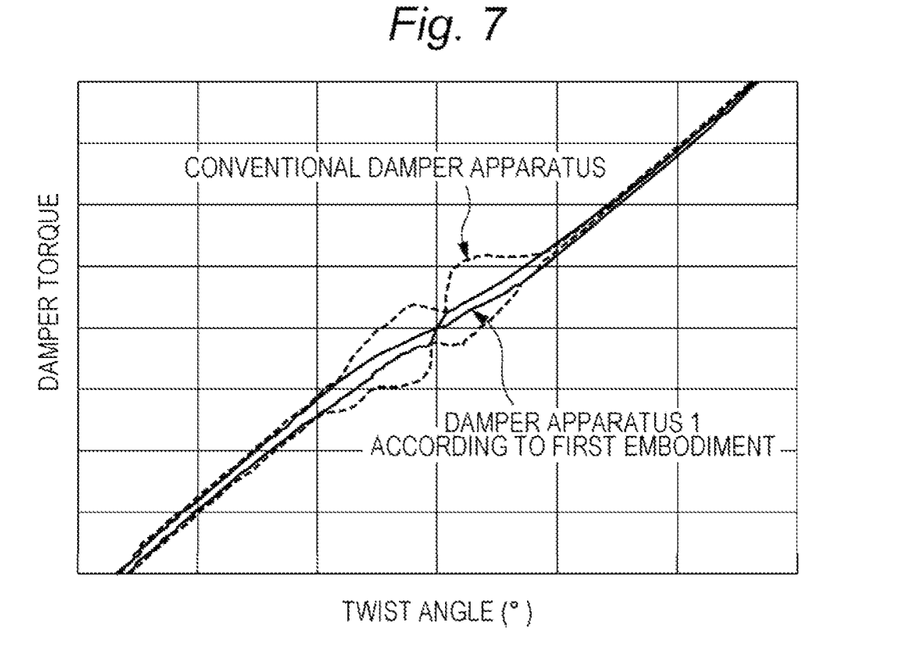
FIG. 7 is a schematic characteristic diagram schematically illustrating torsional characteristics exhibited by the damper apparatus according to the first embodiment.

An outline of an overall configuration of a damper apparatus according to a first embodiment will be described with reference to FIGS. 1 to 7. FIG. 1 is a schematic top view schematically illustrating a configuration of a damper apparatus 1 according to the first embodiment. FIG. 2 is a schematic cross-sectional view schematically illustrating the configuration of the damper apparatus 1 illustrated in FIG. 1 as viewed from a line II-II. FIG. 3 is a schematic perspective view illustrating the configuration of the damper apparatus 1 according to the first embodiment in an exploded manner into each component. FIG. 4 is a schematic top view illustrating a contact relationship between a first rotating body 100 and a seat member 350 with respect to the configuration of the damper apparatus 1 illustrated in FIG. 1. FIG. 5 is a schematic top view illustrating a contact relationship between a second rotating body 200 and the seat member 350 with respect to the configuration of the damper apparatus 1 illustrated in FIG. 1. FIG. 6 is a graph illustrating a relationship between an angle θ(θ1 and θ2) at a point of contact between the first rotating body 100 and the seat member 350 or a point of contact between the second rotating body 200 and the seat member 350 (P1 and P2), and a value (μF cos θ−F sin θ) obtained by subtracting component force F sin θ of centrifugal force F acting on the point of contact from friction μF cos θ acting on the point of contact, where the centrifugal force acting on the point of contact is denoted by F. FIG. 7 is a schematic characteristic diagram schematically illustrating torsional characteristics exhibited by the damper apparatus 1 according to the first embodiment.

The damper apparatus 1 according to the first embodiment is, for example, sandwiched between a flywheel (not illustrated) and a pressure plate (not illustrated) to transmit drive source from a drive source (not illustrated) such as an engine or a motor to a transmission. Since the structure for sandwiching the damper apparatus 1 between the flywheel and the pressure plate is known, detailed description thereof will be omitted.

The damper apparatus 1 absorbs and damps torque vibration. As illustrated in FIGS. 1 to 4, the damper apparatus 1 mainly includes a disc plate 100 as a first rotating body, a hub 200 as a second rotating body, and an elastic mechanism unit 300 that has an elastic body 310 and paired seat members 350 that support the elastic body 310 from both ends.

1-1. Disc Plate 100

In the damper apparatus 1, the power from a drive source is transmitted (input) via a flywheel, a cover plate 10, a pressure plate 20, and the like to the disc plate 100 as a first rotating body. The disc plate 100 is formed of, for example, a metal material, and as illustrated in FIGS. 1 to 3, the disc plate 100 is rotatably provided around the hub 200 and a rotation axis O so as to sandwich the hub 200 as a second rotating body.

The disc plate 100 includes a first disc plate 100A and a second disc plate 100B as paired plate members provided on both sides of the hub 200 in an axial direction. The first disc plate 100A and the second disc plate 100B have shapes that are symmetrical to each other in the axial direction, and the positions in the axial direction of the first disc plate 100A and the second disc plate 100B are connected near outer peripheries by a plurality of rivets R or the like through through-holes 105 with a spacer 101 that can be adjusted appropriately being interposed between the first disc plate 100A and the second disc plate 100B. As a result, the first disc plate 100A and the second disc plate 100B can rotate integrally around the rotation axis O.

As illustrated in FIGS. 1 and 3, the first disc plate 100A and the second disc plate 100B each have curved surface portions 150 for the purpose of cooperating with each other to form a housing region (in the example illustrated in FIG. 1, four housing regions) that corresponds to each of regions I to IV and houses the elastic mechanism unit 300. The curved surface portion 150 has a predetermined curvature projecting in the axial direction. The curved surface portion 150 is provided so as to be in contact with a first surface portion 356 on a radially outer end surface 355 of the seat member 350 in the elastic mechanism unit 300. The state where the curved surface portion 150 and the first surface portion 356 are in contact with each other will be described in detail later.

Each housing region extends in a substantially straight line or in a substantially arc shape along a circumferential direction of the disc plate 100 in order to house the elastic body 310 extending along the circumferential direction of the disc plate 100 and the paired seat members 350 (350A and 350B) that support the elastic body 310 from both ends. The regions I to IV refer to four regions each of which has a fan shape with an angle of approximately 90 degrees when the damper apparatus 1 is viewed from the top surface, as illustrated in FIG. 1.

A more specific description will be given with reference to FIGS. 1 and 3. The first disc plate 100A and the second disc plate 100B each include a first housing region 103a, a second housing region 103b, a third housing region 103c, and a fourth housing region 103d that extend in the circumferential direction and correspond to the regions I to IV, respectively. The hub 200, which will be described later, includes window holes 206a, 206b, 206c, and 206d so as to correspond to the first housing region 103a, the second housing region 103b, the third housing region 103c, and the fourth housing region 103d, respectively.

When the region I is focused on, as illustrated in FIGS. 1 and 3, the first disc plate 100A and the second disc plate 100B include, as a side wall surrounding the first housing region 103a, one end surface (first one end surface) $104a_1$ and the other end surface (first other end surface) $104a_2$ that faces the one end surface $104a_1$.

Similarly, when the region II is focused on, the first disc plate 100A and the second disc plate 100B include, as a side wall surrounding the second housing region 103b, one end surface (second one end surface) $104b_1$ and the other end surface (second other end surface) $104b_2$ that faces the one end surface $104b_1$. When the region III is focused on, the first disc plate 100A and the second disc plate 100B include, as a side wall surrounding the third housing region 103c, one end surface (third one end surface) $104c_1$ and the other end surface (third other end surface) $104c_2$ that faces the one end surface $104c_1$. When the region IV is focused on, the first disc plate 100A and the second disc plate 100B include, as a side wall surrounding the fourth housing region 103d, one end surface (fourth one end surface) $104d_1$ and the other end surface (fourth other end surface) $104d_2$ that faces the one end surface $104d_1$.

The first one end surface $104a_1$, the first other end surface $104a_2$, the second one end surface $104b_1$, the second other end surface $104b_2$, the third one end surface $104c_1$, the third other end surface $104c_2$, the fourth one end surface $104d_1$, and the fourth other end surface $104d_2$ that are described above are engaged with a first receiving groove 360 (see FIGS. 10A and 10B) that is formed in the seat member 350 (the seat member 350A or 350B) in the elastic mechanism unit 300 housed in each of the housing regions I to IV.

Further, the spacer 101 includes a cutaway portion 110 so that the hub 200 to be described later can enter, that is, the hub 200 can move in the circumferential direction (rotate relative to the disc plate 100). Furthermore, an outer edge of the cutaway portion 110 functions as a regulation portion 111 that regulates the relative rotation of the hub 200 with a predetermined twist angle or more. The cutaway portion 110 formed in the spacer 101 may be formed in the first disc plate 100A and the second disc plate 100B.

1-2. Hub 200

The hub 200 as a second rotating body functions as a power output member in the damper apparatus 1, and is formed of, for example, a metal material. The hub 200 has a substantially circular cross-section as a whole, is sandwiched between the first disc plate 100A and the second disc plate 100B, and is provided to be rotatable around the rotation axis O relative to the disc plate 100 (the first disc plate 100A and the second disc plate 100B). Further, as illustrated in FIG. 2, the hub 200 can be spline-connected by inserting an input shaft 500 of a transmission (not illustrated) into a through-hole 203 formed in a cylindrical portion 202 that has a substantially cylindrical shape. Furthermore, the hub 200 includes a disk portion 205 that has an outer diameter extending radially outward from the cylindrical portion 202.

As described above, the disk portion 205 includes the window holes 206a, 206b, 206c, and 206d that correspond to the first housing region 103a, the second housing region 103b, the third housing region 103c, and the fourth housing region 103d, respectively. These window holes 206a, 206b, 206c, and 206d provided in the hub 200 are provided according to the configuration of the elastic mechanism unit 300 to be described later, and more specifically, the number of the elastic bodies 310. That is, the elastic mechanism unit 300 to be described later is housed in each of the window holes 206a, 206b, 206c, and 206d.

Here, when the window hole 206a is focused on, the disk portion 205 includes, as a side wall surrounding (defining) the window hole 206a, a side wall $207a_1$ on one end side (a first side wall on one end side) and a side wall $207a_2$ on the other end side (a first side wall on the other end side) that faces the side wall $207a_1$ on one end side (see FIG. 5). In addition, the disk portion 205 includes a first peripheral wall 208 and a second peripheral wall 209 that surround the window hole 206a in the circumferential direction (define a radially outer side and a radially inner side).

Similarly, when the window hole 206b is focused on, the disk portion 205 includes, as a side wall surrounding (defining) the window hole 206b, a side wall $207b_1$ on one end side (a second side wall on one end side) and a side wall $207b_2$ on the other end side (a second side wall on the other end side) that faces the side wall $207b_1$ on one end side (see FIGS. 3 and 5). In addition, the disk portion 205 includes the first peripheral wall 208 and the second peripheral wall 209 that surround the window hole 206b in the circumferential direction (define the radially outer side and the radially inner side).

Further, when the window hole 206c is focused on, the disk portion 205 includes, as a side wall surrounding (defining) the window hole 206c, a side wall $207c_1$ on one end side (a third side wall on one end side) and a side wall $207c_2$ on the other end side (a third side wall on the other end side) that faces the side wall $207c_1$ on one end side (see FIG. 5). In addition, the disk portion 205 includes the first peripheral wall 208 and the second peripheral wall 209 that surround the window hole 206c in the circumferential direction (define the radially outer side and the radially inner side).

Furthermore, when the window hole 206d is focused on, the disk portion 205 includes, as a side wall surrounding (defining) the window hole 206d, a side wall $207d_1$ on one end side (a fourth side wall on one end side) and a side wall $207d_2$ on the other end side (a fourth side wall on the other end side) that faces the side wall $207d_1$ on one end side (see FIG. 5). In addition, the disk portion 205 includes the first peripheral wall 208 and the second peripheral wall 209 that surround the window hole 206d in the circumferential direction (define the radially outer side and the radially inner side).

The first side wall $207a_1$ on one end side, the first side wall $207a_2$ on the other end side, the second side wall $207b_1$ on one end side, the second side wall $207b_2$ on the other end side, the third side wall $207c_1$ on one end side, the third side wall $207c_2$ on the other end side, the fourth side wall $207d_1$ on one end side, and the fourth side wall $207d_2$ on the other end side that are described above are engaged with a second receiving groove 370 (see FIGS. 10A and 10B) that is formed in the seat member 350A or 350B in the elastic mechanism unit 300 housed in each of the housing regions I to IV.

The first peripheral wall 208 is provided so as to be in contact with a second surface portion 357 on the radially outer end surface 355 of the seat member 350 in the elastic mechanism unit 300. The state where the curved surface portion 150 and the first surface portion 356 are in contact with each other will be described in detail later.

Moreover, projections 210a, 210b, 210c, and 210d are provided at radial end portions of the disk portion 205 so as to correspond to the regions I to IV, respectively. The projections 210a, 210b, 210c, and 210d are housed in the cutaway portions 110 provided in the spacer 101 so that the hub 200 can rotate relative to the disc plate 100. Further, when the hub 200 relatively rotates by a predetermined twist angle, the projections 210a, 210b, 210c, and 210d have a function to come into contact with the regulation portion 111 that is also the outer edge of the cutaway portion 110 and to regulate the relative rotation of the hub 200 by the twist angle or more.

1-3. Elastic Mechanism Unit 300

As illustrated in FIGS. 1 to 5, the first elastic mechanism unit 300 is mainly composed of the elastic body 310 in which a coil spring is mainly used and the paired seat members 350 (the first seat member 350A and the second seat member 350B) that support both ends of the elastic body in each of the regions I to IV. The seat member 350 is formed of, for example, a fiber-reinforced nylon resin, an engineering plastic, or the like. FIGS. 1 to 5 illustrate an example in which one coil spring is used in each region, but the present disclosure is not limited to this, and for example, two coil springs may be arranged in series.

In the damper apparatus 1 according to the first embodiment illustrated in FIGS. 1 to 5, as an example, the disc plate 100 has four housing regions, that is, the first housing region 103a, the second housing region 103b, the third housing region 103c, and the fourth housing region 103d (the hub 200 includes the window holes 206a, 206b, 206c, and 206d corresponding to the respective regions, as described above), and thus one elastic body 310 is housed in each of these four housing regions, that is, so as to correspond to each of the respective regions I to IV. Further, in each of the regions I to IV, the elastic body 310 is supported by the paired seat members 350 (the first seat member 350A and the second seat member 350B) at both ends in each housing region.

Here, when the region I is focused on, one of the seat members 350 (the first seat member 350A) that support the elastic body 310 houses the first one end surface $104a_1$ formed in the disc plate 100 in the first receiving groove 360 (see FIGS. 10A and 10B) to be engaged with the disc plate 100. In addition, the first seat member 350A also houses the first side wall $207a_1$ on one end side that is formed in the hub 200 in the second receiving groove 370 (see FIGS. 10A and 10B) to be engaged with the hub 200.

Further, the other of the seat members 350 (the second seat member 350B) that support the elastic body 310 houses the first other end surface $104a_2$ formed in the disc plate 100 in the first receiving groove 360 (see FIGS. 10A and 10B) to be engaged with the disc plate 100. In addition, the second seat member 350B also houses the first side wall $207a_2$ on the other end side that is formed in the hub 200 in the second receiving groove 370 (see FIGS. 10A and 10B) to be engaged with the hub 200. The configuration of the seat member 350 described for the region I is similar to those for the regions II to IV.

With the above configuration, the elastic body 310 can elastically connect the disc plate 100 and the hub 200 in the rotational direction via the seat member 350. That is, when the power from a drive source such as an engine or a motor is transmitted in the order of the disc plate 100, the first seat member 350A, the elastic body 310, the second seat member 350B, and the hub 200 (assuming a case where positive power in a clockwise direction is transmitted), and the disc plate 100 and the hub 200 rotate relative to each other, the elastic body 310 is compressed and deformed to absorb torque fluctuations.

Further, the seat member 350 (the first seat member 350A and the second seat member 350B) includes, at its radially outer end surface 355, the first surface portion 356 (see FIG. 4) that comes into contact with the curved surface portion 150 of the disc plate 100 and the second surface portion 357 (see FIG. 5) that comes into contact with the first peripheral wall 208 of the hub 200.

Here, the contact relationship between the curved surface portion 150 of the disc plate 100 and the first surface portion 356 of the seat member 350 will be described with reference to FIG. 4. Note that FIG. 4 is a view seen from a direction indicated by arrows on a line B-B in FIG. 2.

When the region I is focused on, as illustrated in FIG. 4, the first surface portion 356 of the seat member 350 (the first seat member 350A) comes into contact with the curved surface portion 150 of the disc plate 100 in a case where the disc plate 100 and the hub 200 are not relatively rotated (in a case where the twist angle is 0°). At this time, a tangent line L1 at a point P1 of contact (a first point P1 of contact) between the curved surface portion 150 of the disc plate 100 and the first surface portion 356 extends in a direction indicated by a dotted line. This tangent line L1 includes, at the point P1 of contact, a first vector in the rotational direction (a vector in the X direction in FIG. 4) and a second vector in a direction orthogonal to the rotational direction (a vector in the Y direction in FIG. 4). That is, the curved surface portion 150 and the first surface portion 356 are designed so that an angle θ1 is intentionally formed between the tangent line L1 and the first vector in the rotational direction.

As the curved surface portion 150 and the first surface portion 356 are designed as described above, in a case where the centrifugal force F acts at the point P1 of contact in the direction orthogonal to the rotational direction (the second vector), component force F sin θ1 of the centrifugal force F acts in the direction in which the tangent line L1 extends. Further, frictional force μ1F cos θ1 acts in a direction opposite to the direction in which the tangent line L1 extends. Here, μ1 indicates a coefficient of friction between the curved surface portion 150 and the first surface portion 356, and the frictional force at the point P1 of contact is obtained by the product of normal force F cos θ1 acting in a direction orthogonal to the tangent line L1 (a direction of L2 in FIG. 4) and the coefficient μ1 of friction.

Here, it is designed so that the relationship between the frictional force μ1F cos θ1 and the component force F sin θ1 of the centrifugal force F satisfies $-0.1F \leq \mu 1F \cos \theta 1 - F \sin \theta 1 \leq 0.1F$. Satisfying the above relational expression means that the frictional force acting on the point P1 of contact is canceled (offset) by the component force F sin θ1 of the centrifugal force F. As a result, the sliding resistance (hysteresis torque) between the curved surface portion 150 and the first surface portion 356 is reduced, and thus the seat member 350 can move smoothly in the rotational direction.

Note that the design of the curved surface portion 150 and the first surface portion 356 is similarly applied not only to the first seat member 350A but also to the second seat member 350B. Further, the configuration of the curved surface portion 150 and the first surface portion 356 described for the region I is similar to those for the regions II to IV.

Next, the contact relationship between the first peripheral wall 208 of the hub 200 and the second surface portion 357 of the seat member 350 will be described with reference to FIG. 5. Note that FIG. 5 is a view seen from a direction indicated by arrows on a line C-C in FIG. 2.

The contact relationship between the first peripheral wall 208 and the second surface portion 357 is also the same as the relationship between the curved surface portion 150 and the first surface portion 356, which has been described above.

That is, when the region I is focused on, as illustrated in FIG. 5, the second surface portion 357 of the seat member 350 (the first seat member 350A) comes into contact with the first peripheral wall 208 of the hub 200 in a case where the disc plate 100 and the hub 200 are not relatively rotated (in a case where the twist angle is 0°). At this time, a tangent line M1 at a point P2 of contact (a second point P2 of contact) between the first peripheral wall 208 of the hub 200 and the second surface portion 357 extends in a direction indicated by a dotted line. This tangent line M1 includes, at the point P2 of contact, a third vector in the rotational direction (a vector in the X direction in FIG. 5) and a fourth vector in a direction orthogonal to the rotational direction (a vector in the Y direction in FIG. 5). That is, the first peripheral wall 208 and the second surface portion 357 are designed so that an angle θ2 is intentionally formed between the tangent line M1 and the first vector in the rotational direction.

As the first peripheral wall 208 and the second surface portion 357 are designed as described above, in a case where the centrifugal force F acts at the point P2 of contact in the direction orthogonal to the rotational direction (the fourth vector), component force Fsinθ2 of the centrifugal force F acts in the direction in which the tangent line M1 extends. Further, frictional force μ2Fcosθ2 acts in a direction opposite to the direction in which the tangent line M1 extends. Here, μ2 indicates a coefficient of friction between the first peripheral wall 208 and the second surface portion 357, and the frictional force at the point P2 of contact is obtained by the product of normal force Fcosθ2 acting in a direction orthogonal to the tangent line M1 and the coefficient μ2 of friction.

Here, it is designed so that the relationship between the frictional force μ2Fcosθ2 and the component force Fsinθ2 of the centrifugal force F satisfies $-0.1F \leq \mu 2F \cos \theta 2 - F \sin \theta 2 \leq 0.1F$. Satisfying the above relational expression means that (at least part of) the frictional force acting on the point P2 of contact is canceled (offset) by the component force Fsinθ2 of the centrifugal force F. As a result, the sliding resistance (hysteresis torque) between the first peripheral wall 208 and the second surface portion 357 is reduced, and thus the seat member 350 can move smoothly in the rotational direction.

Note that it is most preferable to design the curved surface portion 150, the first surface portion 356, the first peripheral wall 208, and the second surface portion 357 so that "μ1Fcosθ1−Fsinθ1" and "μ2Fcosθ2−Fsinθ2" are infinitely close to 0.

In order to satisfy $-0.1F \leq \mu 1F \cos \theta 1 - F \sin \theta 1 \leq 0.1F$ in the contact relationship between the curved surface portion 150 and the first surface portion 356, as illustrated in FIG. 6, it is only required to specifically design the shapes of the curved surface portion 150 and the first surface portion 356 so that $11.5° \leq \theta 1 \leq 22.0°$ is satisfied (in a case where the coefficient μ1 of friction is 0.3). Further, in order to cause "μ1Fcosθ1−Fsinθ1" to be infinitely close to 0, it is preferable to satisfy 14.0° 81 20.0° (in a case where the coefficient μ1 of friction is 0.3).

Similarly, in order to satisfy $-0.1F \leq \mu 2F \cos \theta 2 - F \sin \theta 2 \leq 0.1F$ in the contact relationship between the first peripheral wall 208 and the second surface portion 357, as illustrated in FIG. 6, it is only required to specifically design the shapes of the first peripheral wall 208 and the second surface portion 357 so that $11.5° \leq \theta 2 \leq 22.0°$ (in a case where the coefficient μ2 of friction is 0.3). Further, in order to cause "μ2Fcosθ2−Fsinθ2" to be infinitely close to 0, it is preferable to satisfy $14.0° \leq \theta 2 \leq 20.0°$ (in a case where the coefficient μ2 of friction is 0.3).

If the coefficient μ1 of friction between the curved surface portion 150 and the first surface portion 356 and the coefficient μ2 of friction between the first peripheral wall 208 and the second surface portion 357 are not 0.3, the characteristic diagram illustrated in FIG. 6 may be referenced to appropriately adjust θ1 and θ2 according to the actual coefficient of friction.

From the viewpoint of positional stability of the elastic mechanism unit 300, the point of contact (the point P2 of contact) between the second surface portion 357 and the first peripheral wall of the hub 200 is preferably designed to be radially outside the elastic body 310 as illustrated in FIG. 5.

1-4. Characteristics of Damper Apparatus 1

The damper apparatus 1 with the configuration described above can have the torsional characteristics illustrated in FIG. 7. Specifically, in a region where the twist angle due to the relative rotation of the disc plate 100 and the hub 200 is around 0°, the generation of hysteresis torque can be efficiently reduced as compared with the conventional case.

2. Modifications

Figure 8:
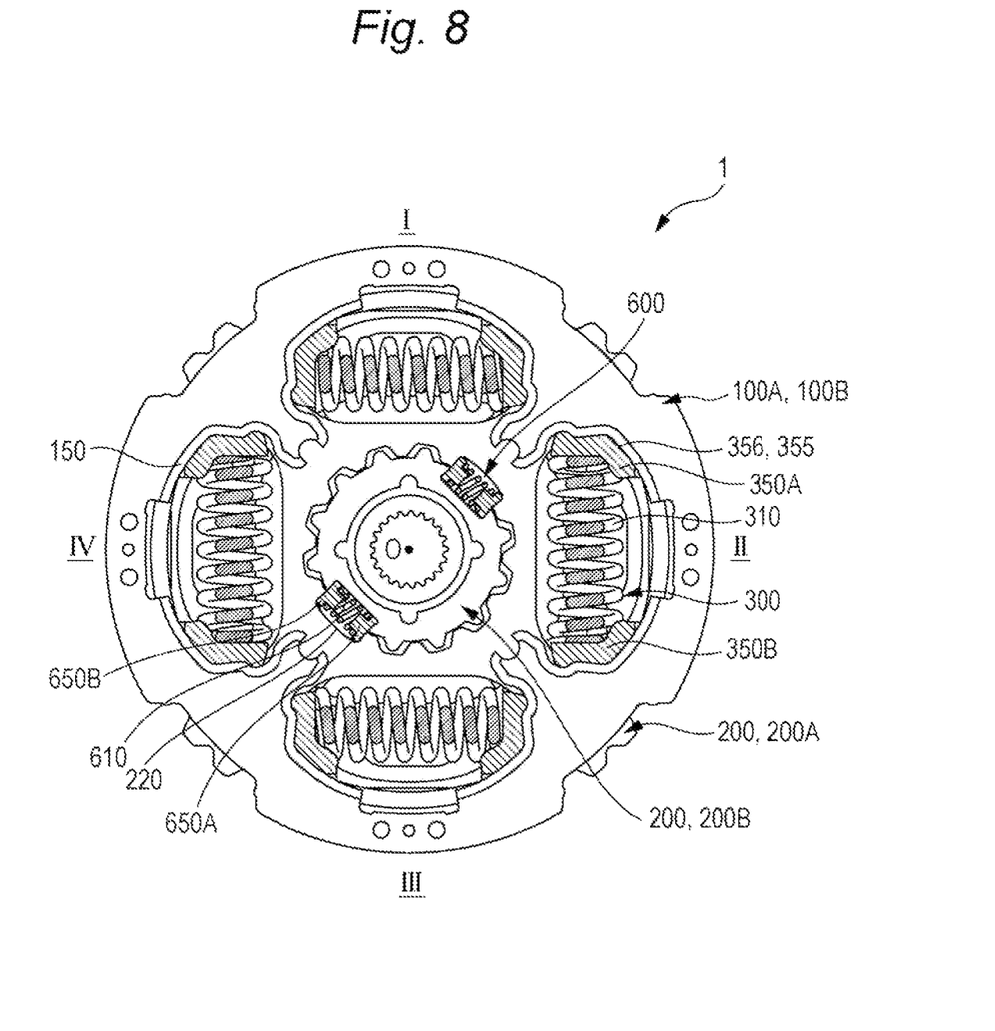
FIG. 8 is a schematic top view schematically illustrating a configuration of a damper apparatus according to a second embodiment.
Figure 9A:
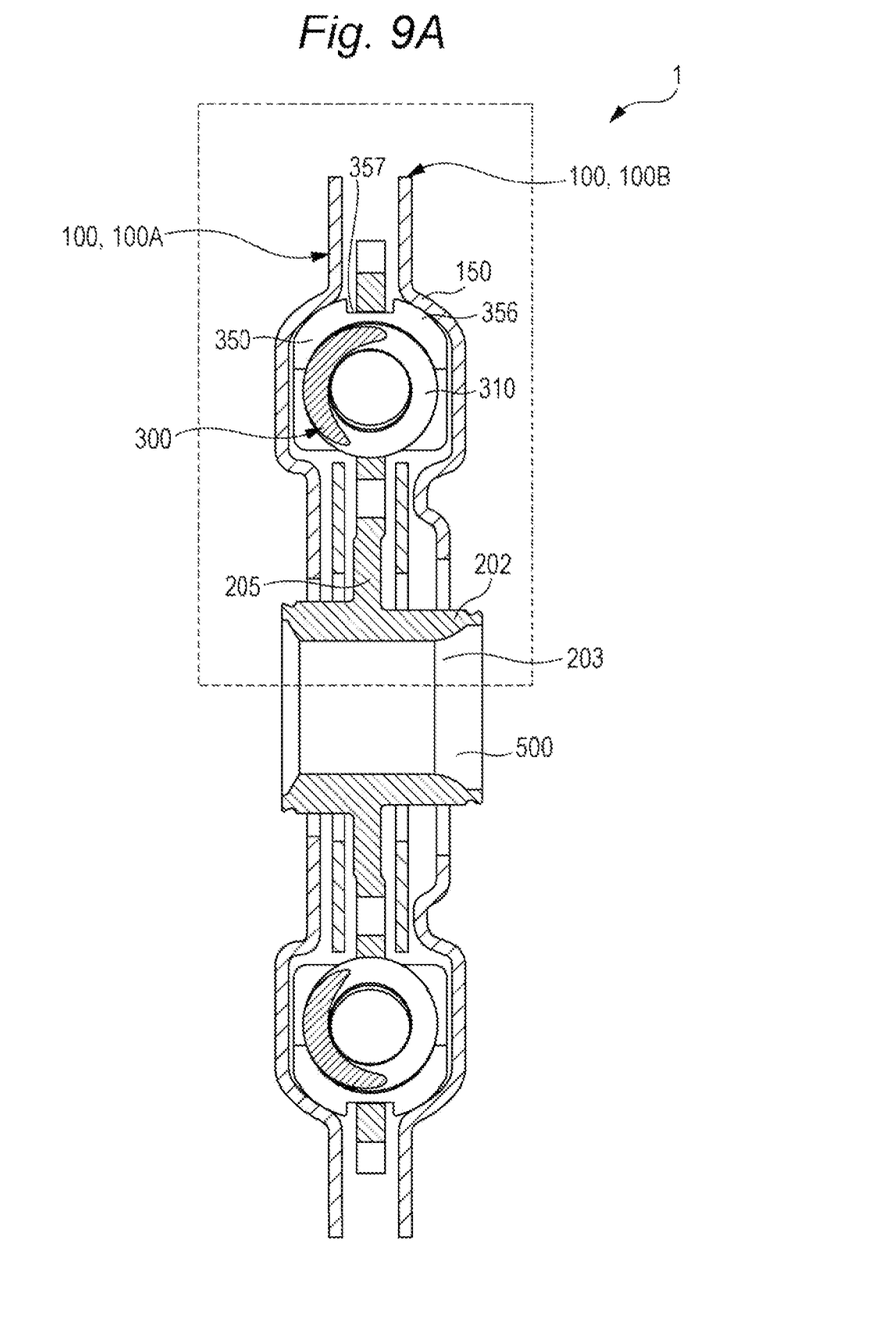
FIG. 9A is a schematic cross-sectional view schematically illustrating a configuration of a damper apparatus according to a third embodiment.
Figure 9B:
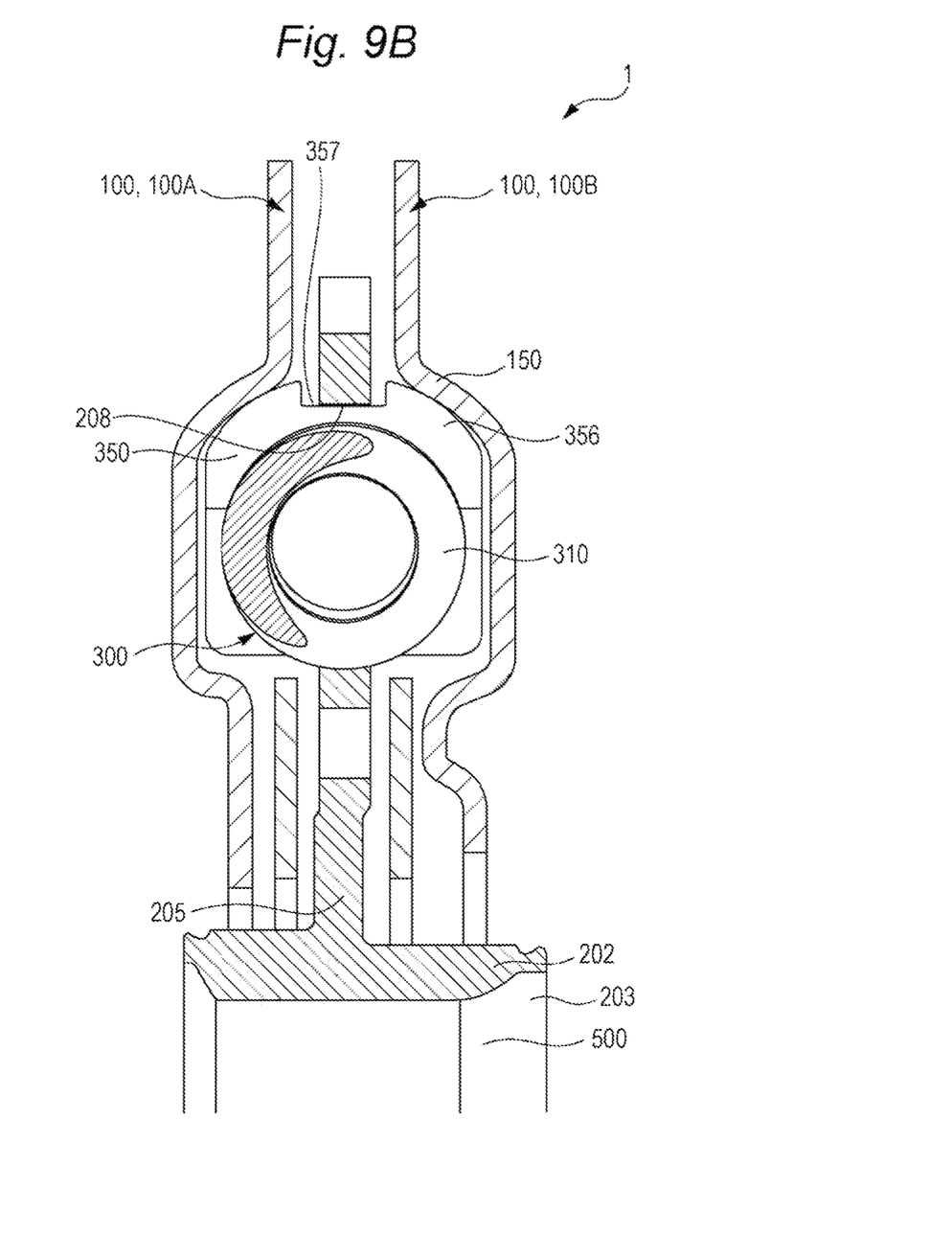
FIG. 9B is a schematic cross-sectional view illustrating an area in the damper apparatus illustrated in FIG. 9A in an enlarged manner, the area being surrounded by a dotted line in FIG. 9A.
Figure 10A:
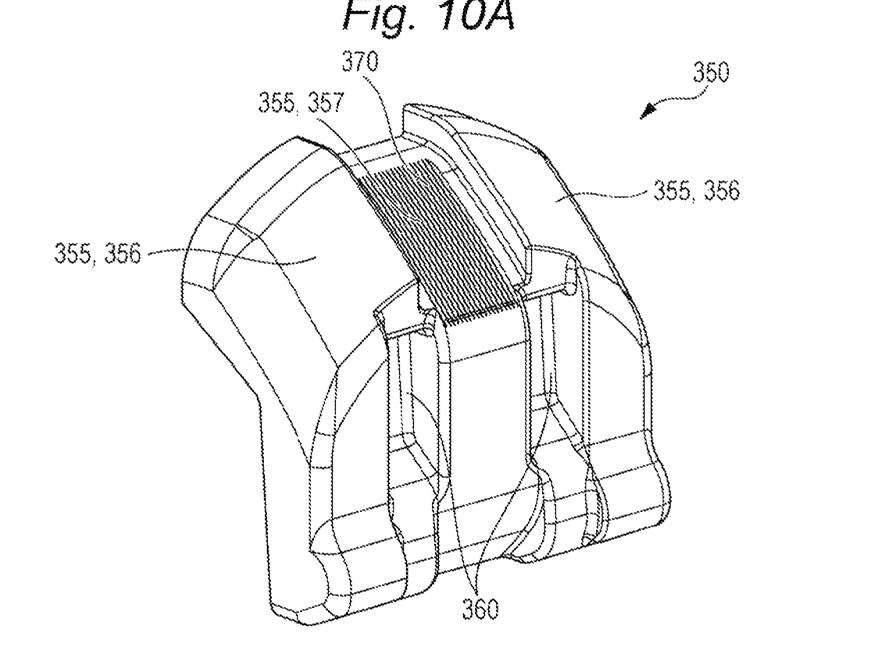
FIG. 10A is a schematic perspective view illustrating an example of a seat member applied to a damper apparatus according to a fourth embodiment in an enlarged manner.
Figure 10B:
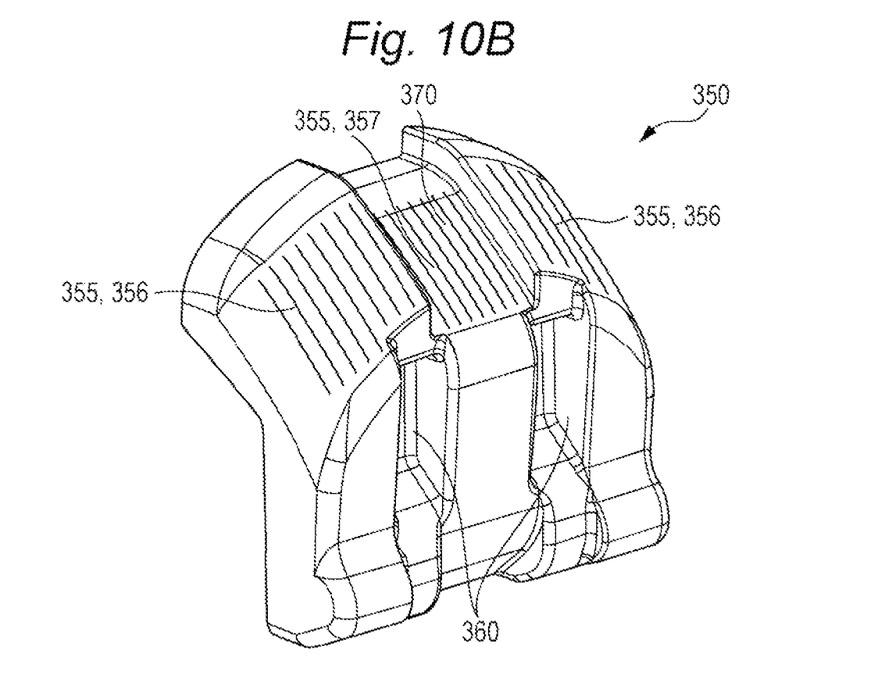
FIG. 10B is a schematic perspective view illustrating another example of the seat member applied to the damper apparatus according to the fourth embodiment in an enlarged manner.

Next, a configuration of a damper apparatus 1 according to another embodiment will be described with reference to FIGS. 8 to 10B. FIG. 8 is a schematic top view schematically illustrating a configuration of a damper apparatus 1 according to a second embodiment. FIG. 9A is a schematic cross-sectional view schematically illustrating a configuration of a damper apparatus 1 according to a third embodiment. FIG. 9B is a schematic cross-sectional view illustrating an area in the damper apparatus 1 illustrated in FIG. 9A in an enlarged manner, the area being surrounded by a dotted line in FIG. 9A. FIG. 10A is a schematic perspective view illustrating an example of the seat member 350 applied to a damper apparatus 1 according to a fourth embodiment in an enlarged manner. FIG. 10B is a schematic perspective view illustrating another example of the seat member 350 applied to the damper apparatus 1 according to the fourth embodiment in an enlarged manner.

2-1. Second Embodiment

The damper apparatus 1 according to the second embodiment has a configuration substantially similar to that of the damper apparatus 1 according to the first embodiment described above, but the damper apparatus 1 according to the second embodiment is a known so-called separate hub type damper apparatus 1 in which the hub 200 of the damper apparatus 1 according to the first embodiment is split into two hubs 200A and 200B to output power.

In the damper apparatus 1 according to the second embodiment, the inner teeth of the hub 200A (a radially outer side) and the outer teeth of the hub 200B (a radially inner side) are meshed with each other, and a second elastic mechanism unit 600 is disposed between the two hubs on a power transmission path. The second elastic mechanism unit 600 makes it possible for the damper apparatus 1 to absorb and damp a wider range of torque vibration than the damper apparatus 1 according to the first embodiment.

Similar to the elastic mechanism unit 300 described above, the second elastic mechanism unit 600 is mainly composed of a second elastic body 610 in which a coil spring is mainly used and paired inner seat members 650 (an inner first seat member 650A and an inner second seat member 650B) that support both ends of the second elastic body 610. The inner seat member 650 is configured to come into contact with an inner wall 220 of the hub 200A. Consequently, the contact relationship between a radially outer end surface 655 of the inner seat member 650 and the inner wall 220 of the hub 200A may be similar to that between the curved surface portion 150 and the first surface portion 356 (or the second surface portion 357) described above.

2-2. Third Embodiment

The damper apparatus 1 according to the third embodiment has a configuration substantially similar to that of the damper apparatus 1 according to the first embodiment described above, but is different from the damper apparatus 1 according to the first embodiment described above in that, as illustrated in FIGS. 9A and 9B, (at least part of) the first surface portion 356 includes a curved surface so as to have a curvature smaller than a predetermined curvature of the curved surface portion 150 of the disc plate 100.

In the third embodiment, even if there is a manufacturing error between the first surface portion 356 and one disc plate 100, a curved surface that has a curvature smaller than the predetermined curvature of the curved surface portion 150 is formed on at least part of the first surface portion 356, and thus the surface pressure of the curved surface (the pressure received from the curved surface portion 150) is intentionally increased at the initial stage of use of the first surface portion 356 (a predetermined period of time after the shipment from the factory), so that the wear of the curved surface can progress. As a result, even if there is a manufacturing error between the first surface portion 356 and the disc plate 100, it is possible to achieve the contact relationship between the curved surface portion 150 and the first surface portion 356 of the damper apparatus 1 according to the first embodiment after a certain period of time.

2-3. Fourth Embodiment

The damper apparatus 1 according to the fourth embodiment has a configuration substantially similar to that of the damper apparatus 1 according to the first embodiment described above, but is different from the damper apparatus 1 according to the first embodiment described above in that, as illustrated in FIGS. 10A and 10B, projections and recesses are formed on at least part of the first surface portion 356 and/or the second surface portion 357 on the radially outer end surface 355 of the seat member 350.

As an example of the seat member 350 applied to the damper apparatus 1 according to the fourth embodiment, as illustrated in FIG. 10A, the second surface portion 357 includes projections and recesses. As for these projections and recesses, for example, as illustrated in FIG. 10B, grooves may be formed at predetermined intervals or in a mesh shape.

As another example of the seat member 350 applied to the damper apparatus 1 according to the fourth embodiment, as illustrated in FIG. 10B, both the first surface portion 356 and the second surface portion 357 include projections and recesses.

In the fourth embodiment, even if there is a manufacturing error between the first surface portion 356 and the disc plate 100 and/or between the second surface portion 357 and the hub 200, the first surface portion 356 and/or the second surface portion 357 include projections and recesses, and thus the surface pressure of the projections and recesses (the pressure received from the curved surface portion 150 and/or the first peripheral wall 208) is intentionally increased at the initial stage of use (a predetermined period of time after the shipment from the factory), so that the wear of the projections and recesses can progress. As a result, even if there is a manufacturing error between the first surface portion 356 and the disc plate 100 and/or between the second surface portion 357 and the hub 200, it is possible to achieve the configuration of the damper apparatus 1 according to the first embodiment after a certain period of time.

As described above, various embodiments have been exemplified, but the above embodiments are merely examples, and the scope of the present disclosure is not intended to be limited. The above embodiments can be implemented in various other forms, and various omissions, substitutions, and changes can be made without departing from the gist of the present disclosure. In addition, the configuration, shape, size, length, width, thickness, height, number, and the like can be appropriately changed for implementation.

Note that the various above embodiments have been described assuming that the curved surface portion 150 of the disc plate 100 comes into contact with the first surface portion 356 of the seat member 350, and the first peripheral wall 208 of the hub 200 comes into contact with the second surface portion 357 of the seat member 350, but the present disclosure is not limited to this. That is, depending on the configuration of the damper apparatus 1, the first peripheral wall 208 of the hub 200 may come into contact with the first surface portion 356, and the curved surface portion 150 of the disc plate 100 may come into contact with the second surface portion 357.

A damper apparatus 1 according to an aspect includes a first rotating body 100 that rotates around a rotation axis, a second rotating body 200 that rotates relative to the first rotating body 100 around the rotation axis, and an elastic mechanism unit that includes an elastic body and paired seat members that support both ends of the elastic body, and that elastically connects the first rotating body 100 and the second rotating body 200 in a rotational direction. Each of the paired seat member includes, on a radially outer end surface, a first surface portion that comes into contact with one of the first rotating body 100 and the second rotating body 200 and a second surface portion that comes into contact with another of the first rotating body 100 and the second rotating body 200 when a twist angle related to the relative rotation of the first rotating body 100 and the second rotating body 200 is 0°. When the twist angle is 0°, a first angle θ1 that is formed by a first tangent line at a first point of contact where one of the first rotating body 100 and the second rotating body 200 comes into contact with the first surface portion, the first tangent line including a first vector in the rotational direction and a second vector in a direction orthogonal to the rotational direction, and the first vector is 11.5°≤θ1≤22.0°. When the twist angle is 0°, a second angle θ2 that is formed by a second tangent line at a second point of contact where the another of the first rotating body 100 and the second rotating body 200 comes into contact with the second surface portion, the second tangent line including a third vector in the rotational direction and a fourth vector in a direction orthogonal to the rotational direction, and the third vector is 11.5°≤θ2≤22.0°.

According to the damper apparatus with this configuration, the generation of hysteresis torque due to the sliding of the seat member and the first rotating body and the sliding of the seat member and the second rotating body can be reduced at a twist angle of relative rotation of around 0°.

Further, in the damper apparatus according to an aspect, a coefficient of friction at the first point of contact and the second point of contact is preferably 0.2 to 0.4.

With this configuration, it is possible to efficiently reduce the generation of hysteresis torque in the damper apparatus according to an aspect.

Moreover, in the damper apparatus according to an aspect, at least one of the first surface portion and the second surface portion preferably has projections and recesses.

With this configuration, even if there is a manufacturing error at the time of shipment from the factory at least one of between the first surface portion and one of the first rotating body and the second rotating body, and between the second surface portion and another of the first rotating body and the second rotating body, the first surface portion and/or the second surface portion include projections and recesses, and thus the surface pressure of the projections and recesses is intentionally increased at the initial stage of use (a predetermined period of time after the shipment from the factory), so that the wear of the projections and recesses can progress. As a result, it is possible to achieve the configuration of the damper apparatus according to an aspect in which even if there is a manufacturing error at least one of between the first surface portion and one of the first rotating body and the second rotating body, and between the second surface portion and another of the first rotating body and the second rotating body, the generation of hysteresis torque can be reduced at a twist angle of relative rotation of around 0°.

Furthermore, in the damper apparatus 1 according to an aspect, the first rotating body 100 preferably includes a curved surface portion that comes into contact with the first surface portion and has a predetermined curvature, and at least part of the first surface portion is preferably a curved surface that has a curvature smaller than the predetermined curvature of the curved surface portion.

With this configuration, even if there is a manufacturing error between the first surface portion and one of the first rotating body 100 and the second rotating body 200, a curved surface that has a curvature smaller than the predetermined curvature of the curved surface portion of the first rotating body 100 is formed on at least part of the first surface portion, and thus the surface pressure of the curved surface is intentionally increased at the initial stage of use of the first surface portion, so that the wear of the curved surface can progress. As a result, it is possible to achieve the configuration of the damper apparatus 1 according to an aspect in which even if there is a manufacturing error between the first surface portion and one of the first rotating body 100 and the second rotating body 200, the generation of hysteresis torque can be reduced at a twist angle of relative rotation of around 0°.

A damper apparatus 1 according to another aspect includes a first rotating body 100 that rotates around a rotation axis, a second rotating body 200 that rotates relative to the first rotating body 100 around the rotation axis, and an elastic mechanism unit that includes an elastic body and paired seat members that support both ends of the elastic body, and that elastically connects the first rotating body 100 and the second rotating body 200 in a rotational direction. Each of the paired seat members includes, on a radially outer end surface, a first surface portion that comes into contact with one of the first rotating body 100 and the second rotating body 200 and a second surface portion that comes into contact with another of the first rotating body 100 and the second rotating body 200 when a twist angle related to the relative rotation of the first rotating body 100 and the second rotating body 200 is 0°. When the twist angle is 0°, a first angle θ1 is formed by a first tangent line at a first point of contact where one of the first rotating body 100 and the second rotating body 200 comes into contact with the first surface portion, and the first vector, the first tangent line extending in a direction including a first vector in the rotational direction and a second vector in a direction orthogonal to the rotational direction. When the twist angle is 0° and centrifugal force F is generated in the direction orthogonal to the rotational direction, a relationship between frictional force $\mu_1 F\cos\theta_1$ acting in a direction opposite to a direction in which the first tangent line extends and first component force $F\sin\theta_1$ of the centrifugal force F acting in the direction in which the first tangent line extends satisfies $-0.1F \leq \mu_1 F\cos\theta_1 - F\sin\theta_1 \leq 0.1F$, where $\mu_1$ indicates a first coefficient of friction at the first point of contact. When the twist angle is 0°, a second angle θ2 is formed by a second tangent line at a second point of contact where the another of the first rotating body 100 and the second rotating body 200 comes into contact with the second surface portion, and the third vector, the second tangent line extending in a direction including a third vector in the rotational direction and a fourth vector in a direction orthogonal to the rotational direction. When the twist angle is 0° and the centrifugal force F is generated in the direction orthogonal to the rotational direction, a relationship between frictional force $\mu_2 F\cos\theta_2$ acting in a direction opposite to a direction in which the second tangent line extends and second component force $F\sin\theta_2$ of the centrifugal force F acting in the direction in which the second tangent line extends satisfies $-0.1F \leq \mu_2 F\cos\theta_2 - F\sin\theta_2 \leq 0.1F$, where $\mu_2$ indicates a second coefficient of friction at the second point of contact.

According to the damper apparatus with this configuration, the generation of hysteresis torque due to the sliding of the seat member and the first rotating body and the sliding of the seat member and the second rotating body can also be reduced at a twist angle of relative rotation of around 0°.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A damper apparatus comprising:
a first rotating body that rotates around a rotation axis;
a second rotating body that rotates relative to the first rotating body around the rotation axis; and
an elastic mechanism unit that includes an elastic body and paired seat members that support both ends of the elastic body, and that elastically connects the first rotating body and the second rotating body in a rotational direction,
wherein each of the paired seat members includes, on a radially outer end surface, a first surface portion that comes into contact with one of the first rotating body and the second rotating body and a second surface portion that comes into contact with another of the first rotating body and the second rotating body when a twist angle related to the relative rotation of the first rotating body and the second rotating body is 0°,
when the twist angle is 0°, a first angle θ1 that is formed by 1) a first tangent line where the first surface portion comes into contact with the one of the first rotating body and the second rotating body, the first tangent line including a first vector in the rotational direction and a second vector in a direction orthogonal to the rotational direction, and 2) the first vector is 11.5°≤θ1≤22.0°, and
when the twist angle is 0°, a second angle θ2 that is formed by 1) a second tangent line where the second surface portion comes into contact with the another of the first rotating body and the second rotating body, the second tangent line including a third vector in the rotational direction and a fourth vector in a direction orthogonal to the rotational direction, and 2) the third vector is 11.5°≤θ2≤22.0°.

2. The damper apparatus according to claim 1, wherein at least one of the first surface portion and the second surface portion has projections and recesses.

3. A damper apparatus comprising:
a first rotating body that rotates around a rotation axis;
a second rotating body that rotates relative to the first rotating body around the rotation axis; and
an elastic mechanism unit that includes an elastic body and paired seat members that support both ends of the elastic body, and that elastically connects the first rotating body and the second rotating body in a rotational direction,
wherein each of the paired seat members includes, on a radially outer end surface, a first surface portion that comes into contact with one of the first rotating body and the second rotating body and a second surface portion that comes into contact with another of the first rotating body and the second rotating body when a twist angle related to the relative rotation of the first rotating body and the second rotating body is 0°,
when the twist angle is 0°, a first angle θ1 is formed by 1) a first tangent line where the first surface portion comes into contact with the one of the first rotating body and the second rotating body, the first tangent line extending in a direction including a first vector in the rotational direction and a second vector in a direction orthogonal to the rotational direction, and 2) the first vector,
when the twist angle is 0° and centrifugal force F is generated in the direction orthogonal to the rotational direction, a relationship between frictional force μ1Fcosθ1 acting in a direction opposite to a direction in which the first tangent line extends and first component force Fsinθ1 of the centrifugal force F acting in the direction in which the first tangent line extends satisfies −0.1F≤μ1Fcosθ1−Fsinθ1≤0.1F, where μ1 indicates a first coefficient of friction where the first surface portion comes into contact with the one of the first rotating body and the second rotating body,
when the twist angle is 0°, a second angle θ2 is formed by 1) a second tangent line where the second surface portion comes into contact with the another of the first rotating body and the second rotating body, the second tangent line extending in a direction including a third vector in the rotational direction and a fourth vector in a direction orthogonal to the rotational direction, and 2) the third vector, and
when the twist angle is 0° and the centrifugal force F is generated in the direction orthogonal to the rotational direction, a relationship between frictional force μ2Fcosθ2 acting in a direction opposite to a direction in which the second tangent line extends and second component force Fsinθ2 of the centrifugal force F acting in the direction in which the second tangent line extends satisfies −0.1F≤μ2Fcosθ2−Fsinθ2≤0.1F, where μ2 indicates a second coefficient of friction where the second surface portion comes into contact with the another of the first rotating body and the second rotating body.

* * * * *